(12) United States Patent
Hayashi et al.

(10) Patent No.: US 11,437,191 B2
(45) Date of Patent: Sep. 6, 2022

(54) CERAMIC ELECTRONIC COMPONENT AND METHOD OF MANUFACTURING CERAMIC ELECTRONIC COMPONENT

(71) Applicant: Murata Manufacturing Co., Ltd., Nagaokakyo (JP)

(72) Inventors: Kenichi Hayashi, Nagaokakyo (JP); Takiji Kitagawa, Nagaokakyo (JP); Hiroaki Hata, Nagaokakyo (JP); Yuji Muranaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/068,872

(22) Filed: Oct. 13, 2020

(65) Prior Publication Data
US 2021/0125780 A1    Apr. 29, 2021

(30) Foreign Application Priority Data
Oct. 25, 2019    (JP) .............................. JP2019-194820

(51) Int. Cl.
| | |
|---|---|
| *H01G 4/232* | (2006.01) |
| *H01G 13/00* | (2013.01) |
| *H01G 4/30* | (2006.01) |
| *H01G 4/248* | (2006.01) |

(52) U.S. Cl.
CPC .......... *H01G 4/2325* (2013.01); *H01G 4/248* (2013.01); *H01G 4/30* (2013.01); *H01G 13/006* (2013.01)

(58) Field of Classification Search
None
See application file for complete search history.

(56) References Cited

U.S. PATENT DOCUMENTS

| | | | | |
|---|---|---|---|---|
| 6,124,769 A | * | 9/2000 | Igarashi ............... | H01C 17/006 338/254 |
| 2008/0118721 A1 | * | 5/2008 | Horie ................... | H01G 4/2325 428/209 |
| 2012/0288724 A1 | * | 11/2012 | Ogawa .................... | C23C 26/00 428/457 |
| 2014/0321025 A1 | * | 10/2014 | Saito ...................... | C25D 5/617 205/181 |

(Continued)

FOREIGN PATENT DOCUMENTS

| | | |
|---|---|---|
| CN | 104093888 A | 10/2014 |
| JP | 2000-030971 A | 1/2000 |

(Continued)

OTHER PUBLICATIONS

Official Communication issued in corresponding Korean Patent Application No. 10-2020-0132357, dated Sep. 29, 2021.

*Primary Examiner* — Dion R. Ferguson
(74) *Attorney, Agent, or Firm* — Keating & Bennett, LLP (57) ABSTRACT

A ceramic electronic component includes a ceramic body including an internal electrode therein and at least two external electrodes provided on an outer surface of the ceramic body. The external electrode includes an underlying electrode layer provided on the outer surface of the ceramic body, a first Ni plated layer provided on an outer side of the underlying electrode layer, and a second Ni plated layer provided on an outer side of the first Ni plated layer. Ni oxide is present between the first Ni plated layer and the second Ni plated layer.

20 Claims, 4 Drawing Sheets

(56) References Cited

U.S. PATENT DOCUMENTS

| | | | |
|---|---|---|---|
| 2015/0055274 A1* | 2/2015 | Kimura | B23K 20/16 |
| | | | 228/179.1 |
| 2015/0115776 A1* | 4/2015 | Terashita | H01F 27/29 |
| | | | 336/200 |
| 2021/0125780 A1* | 4/2021 | Hayashi | H01G 4/30 |

FOREIGN PATENT DOCUMENTS

| | | | | |
|---|---|---|---|---|
| JP | 2002-170733 A | 6/2002 | | |
| JP | 2012-238784 A | 12/2012 | | |
| JP | 2015-046451 A | 3/2015 | | |
| WO | WO-2007007677 A1 * | 1/2007 | | H01C 1/148 |

* cited by examiner

CERAMIC ELECTRONIC COMPONENT AND METHOD OF MANUFACTURING CERAMIC ELECTRONIC COMPONENT

CROSS REFERENCE TO RELATED APPLICATIONS

This application claims the benefit of priority to Japanese Patent Application No. 2019-194820 filed on Oct. 25, 2019. The entire contents of this application are hereby incorporated herein by reference.

BACKGROUND OF THE INVENTION

1. Field of the Invention

The present invention relates to a ceramic electronic component and a method of manufacturing a ceramic electronic component.

2. Description of the Related Art

A ceramic electronic component such as a multilayer ceramic capacitor has widely been used for electronic devices. For example, Japanese Patent Laying-Open No. 2002-170733 discloses a multilayer ceramic capacitor including a general structure.

The multilayer ceramic capacitor disclosed in Japanese Patent Laid-Open No. 2002-170733 includes an underlying electrode layer formed by applying and baking a conductive paste, an Ni plated layer formed on an outer side of the underlying electrode layer, and an Sn plated layer formed on an outer side of the Ni plated layer. The Ni plated layer is provided mainly for improving soldering heat resistance and joint performance. The Sn plated layer is provided mainly for improving solderability.

Cracks in a ceramic body due to stress in a plated layer of an external electrode in the ceramic electronic component cause problems.

Specifically, when there is large tensile stress in the plated layer of the external electrode, in mounting a completed ceramic electronic component on a substrate by reflow soldering, a crack originating from the vicinity of an edge of the external electrode may be produced in the ceramic body. In reflow soldering, the substrate expands and contracts by heat. When there is large tensile stress in the plated layer of the external electrode, the external electrode cannot sufficiently absorb expansion and contraction of the substrate and cracking may be produced in the ceramic body.

In an example where there is large tensile stress in the plated layer of the external electrode, when the substrate is warped after the completed ceramic electronic component is mounted on the substrate, a crack originating from the vicinity of an edge of the external electrode may be produced in the ceramic body. In this case again, due to large tensile stress in the plated layer of the external electrode, the external electrode cannot sufficiently absorb warpage of the substrate and cracking may be produced in the ceramic body.

In an example where the external electrode includes an underlying electrode layer, an Ni plated layer, and an Sn plated layer, in connection with cracking in the ceramic body due to stress in the plated layer, stress in the Ni plated layer particularly gives rise to a problem. The Sn plated layer is originally soft and molten in solder mounting. Therefore, the Sn plated layer is less likely to be a cause of cracking in the ceramic body.

In the multilayer ceramic capacitor in Japanese Patent Laid-Open No. 2002-170733, a stress relaxing agent is added to the Ni plated layer by adding the stress relaxing agent to an Ni plating bath for forming the Ni plated layer. Consequently, the multilayer ceramic capacitor in Japanese Patent Laid-Open No. 2002-170733 is relaxed in tensile stress in the Ni plated layer and suppresses the production of cracks in the ceramic body in reflow soldering or warpage of the substrate on which the multilayer ceramic capacitor is mounted.

The multilayer ceramic capacitor in Japanese Patent Laid-Open No. 2002-170733, however, suffers from a new problem of interfering with satisfactory solder mounting due to lowering in solderability of the external electrode caused by the addition of the stress relaxing agent to the Ni plating bath, which will briefly be described below.

When a plated layer includes an Ni plated layer and an Sn plated layer on an outer side thereof as in the external electrode of the multilayer ceramic capacitor in Japanese Patent Laid-Open No. 2002-170733, an Ni—Sn alloy layer is normally formed between the Ni plated layer and the Sn plated layer. The Ni—Sn alloy layer is an alloy of Ni and Sn between the Ni plated layer and the Sn plated layer that is produced by mutual diffusion of Ni and Sn over time by heat, and is grown and formed by heat during heat treatment after the Sn plated layer is formed.

The Ni—Sn alloy layer formed between the Ni plated layer and the Sn plated layer and having a uniform thickness is essential for satisfactory solderability by the external electrode. Specifically, in solder mounting (solder mounting by reflow soldering) of a ceramic electronic component on a substrate, solder or a solder-Sn alloy formed of solder and Sn in the Sn plated layer exhibits excellent wettability to a portion where the Ni—Sn alloy layer is formed, whereas it does not exhibit satisfactory wettability to a portion where the Ni—Sn alloy layer is not formed (a portion where the Ni—Sn alloy layer is not formed due to influence of later-described Ni oxide formed on the outer surface of the Ni plated layer). Therefore, unless an Ni—Sn alloy layer having a uniform thickness is formed between the Ni plated layer and the Sn plated layer, solder or a solder-Sn alloy does not satisfactorily spread in a liquid state in that portion. Then, a satisfactory solder fillet is not formed and joining of a ceramic electronic component to a substrate by solder may not be satisfactory.

In the multilayer ceramic capacitor in Japanese Patent Laid-Open No. 2002-170733, by adding a stress relaxing agent to the Ni plating bath for forming the Ni plated layer, the Ni—Sn alloy layer having a uniform thickness may not be formed between the Ni plated layer and the Sn plated layer. Specifically, when the stress relaxing agent is added to the Ni plating bath, Ni oxide (which is normally Ni hydroxide) is formed on the outer surface of the Ni plated layer drawn up from the Ni plating bath. The Ni oxide may be formed by a combination of the following factors (a) to (d): (a) a small grain size and a large number of grain boundaries in an Ni plated coating to which the stress relaxing agent is added; (b) attachment of Ni plating liquid to the outer surface of the Ni plated layer drawn up from the Ni plating bath; (c) a high temperature of the Ni plated layer and the Ni plating liquid attached to the Ni plated layer due to the high temperature of the Ni plating bath; and (d) exposure of the Ni plated layer drawn up from the Ni plating bath to oxygen in air.

When no stress relaxing agent is added to the Ni plating bath as in a conventional example, the factor (a) is not applicable. Therefore, even though a small amount of Ni oxide may be formed on the outer surface of the Ni plated layer, Ni oxide in such an amount that gives rise to a problem is not formed. In contrast, in connection with the multilayer ceramic capacitor in Japanese Patent Laid-Open No. 2002-170733, the addition of the stress relaxing agent to the Ni plating bath for forming the Ni plated layer results in satisfaction of the four factors (a) to (d) as being combined, and the Ni oxide may be formed on the outer surface of the Ni plated layer in a short period of time.

Then, in the multilayer ceramic capacitor in Japanese Patent Laid-Open No. 2002-170733, since Ni oxide is formed on the outer surface of the Ni plated layer, the Ni oxide interferes with formation of the Ni—Sn alloy layer having a uniform thickness between the Ni plated layer and the Sn plated layer in spite of formation of the Sn plated layer on the outer side of the Ni plated layer. Specifically, by adding the stress relaxing agent to the Ni plating bath for forming the Ni plated layer, Ni oxide is formed on the outer surface of the Ni plated layer and the Ni—Sn alloy layer having a uniform thickness is not formed between the Ni plated layer and the Sn plated layer, solder (a solder-Sn alloy) does not spread in a liquid state in solder mounting, and joining of a ceramic electronic component to a substrate by solder may be defective.

SUMMARY OF THE INVENTION

Preferred embodiments of the present invention provide ceramic electronic components that are each able to satisfactorily be mounted on a substrate by solder, in which an external electrode is satisfactory in solderability in spite of an addition of a stress relaxing agent to an Ni plated layer by an addition of the stress relaxing agent to an Ni plating bath, and methods of manufacturing a ceramic electronic component that each facilitate manufacturing of the ceramic electronic components.

A ceramic electronic component according to a preferred embodiment of the present invention includes a ceramic body including an internal electrode therein and at least two external electrodes provided on an outer surface of the ceramic body. Each of the external electrodes includes an underlying electrode layer provided on the outer surface of the ceramic body, a first Ni plated layer provided on an outer side of the underlying electrode layer, and a second Ni plated layer provided on an outer side of the first Ni plated layer. Ni oxide is present between the first Ni plated layer and the second Ni plated layer.

A method of manufacturing a ceramic electronic component according to a preferred embodiment of the present invention includes making a ceramic body including an internal electrode therein and forming an external electrode on an outer surface of the ceramic body. The forming an external electrode includes forming an underlying electrode layer on the outer surface of the ceramic body, forming a first Ni plated layer by electrolytic plating on an outer side of the underlying electrode layer, forming a second Ni plated layer by electrolytic plating on an outer side of the first Ni plated layer, and forming an Sn plated layer by electrolytic plating on an outer side of the second Ni plated layer. A stress relaxing agent is added to an Ni plating bath for forming the first Ni plated layer and an Ni plating bath for forming the second Ni plated layer. A temperature of the Ni plating bath for forming the second Ni plated layer is lower than a temperature of the Ni plating bath for forming the first Ni plated layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

Each preferred embodiment exemplarily shows a preferred embodiment of the present invention, and the present invention is not limited to contents in each of the preferred embodiments. Contents described in different preferred embodiments can also be combined, and in that case, these contents are also encompassed in the present invention. The drawings help understanding of the specification and may be schematically drawn. A ratio of a dimension of a drawn component or components may not be equal to a ratio of the dimension described in the specification. Components described in the specification may be omitted in the drawings or may be drawn with the number thereof being reduced.

A multilayer ceramic capacitor will be described by way of example as a ceramic electronic component according to a preferred embodiment of the present invention. Any type of the ceramic electronic component is applicable in the present invention, and the ceramic electronic component is not limited to the multilayer ceramic capacitor.

Figure 1:
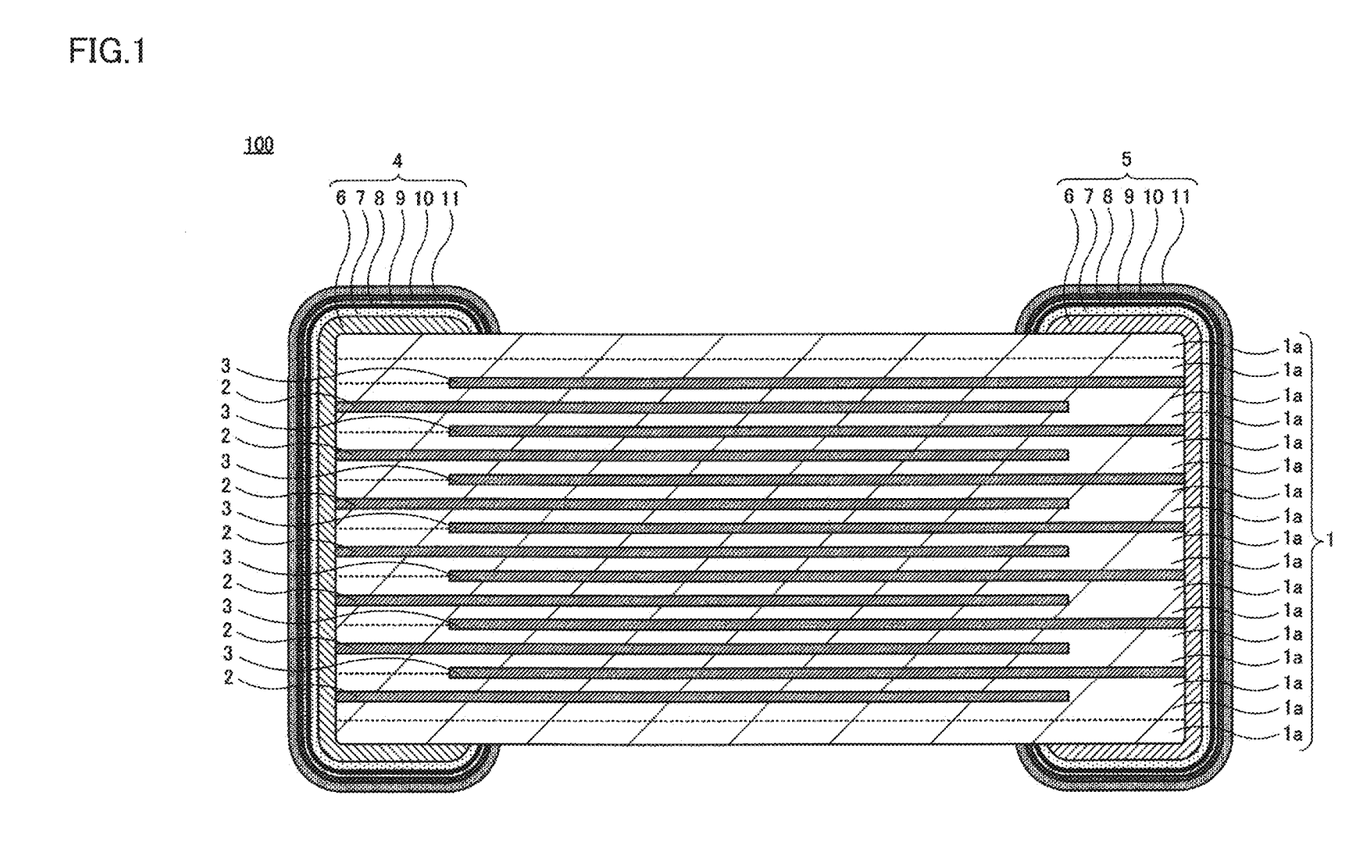
FIG. 1 is a cross-sectional view showing a multilayer ceramic capacitor 100 as an example of a ceramic electronic component according to a preferred embodiment of the present invention.
Figure 2:
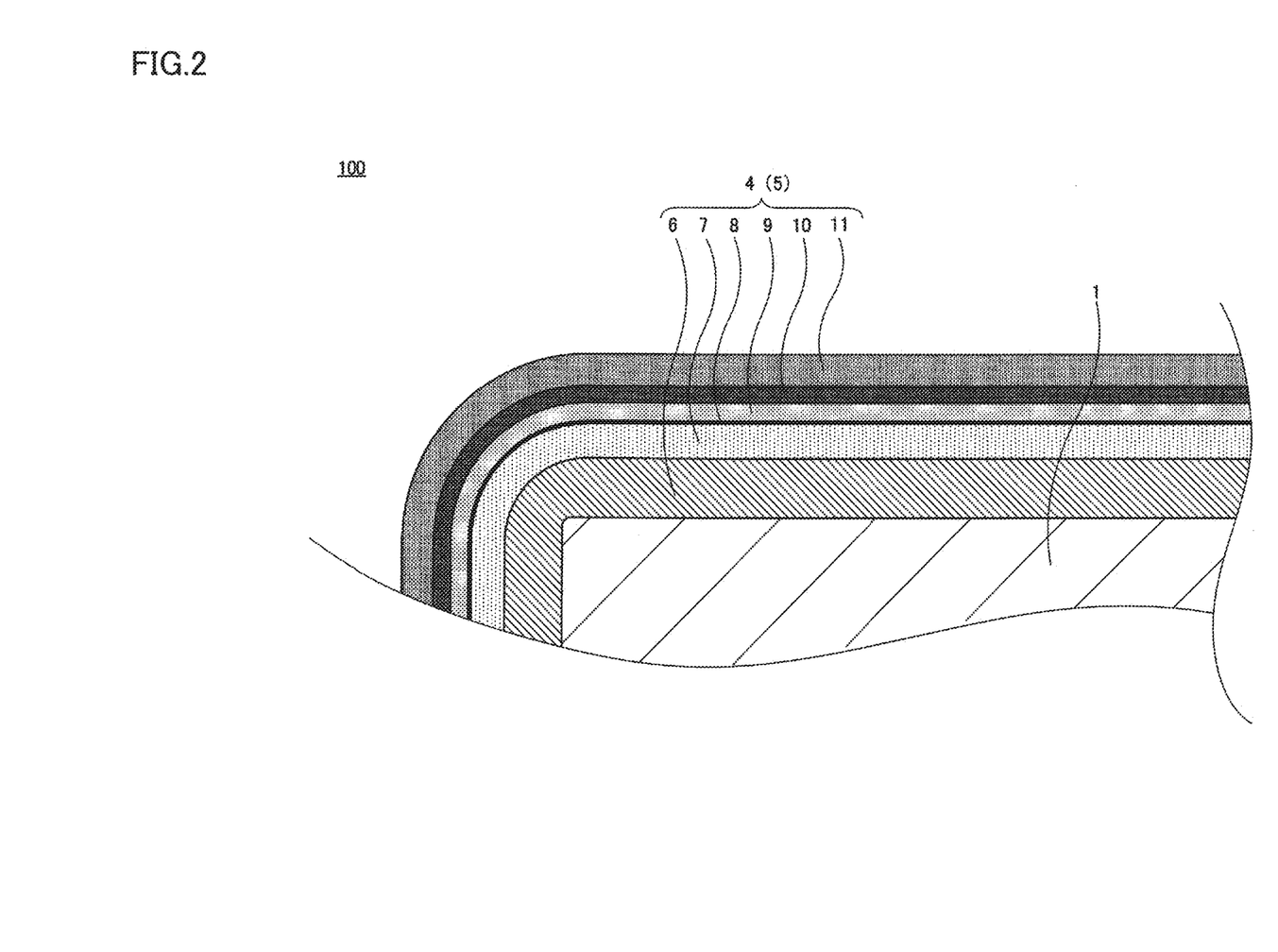
FIG. 2 is a cross-sectional view of a main portion of multilayer ceramic capacitor 100.

FIGS. 1 and 2 show a multilayer ceramic capacitor 100 according to the present preferred embodiment. FIG. 1 is a cross-sectional view of multilayer ceramic capacitor 100. FIG. 2 is a cross-sectional view of a main portion of multilayer ceramic capacitor 100 and shows an external electrode 4 or 5 of multilayer ceramic capacitor 100 as being enlarged.

Multilayer ceramic capacitor 100 includes a ceramic body 1 including a plurality of ceramic layers 1a and a plurality of internal electrodes 2 and 3 as being layered. Ceramic body 1 is in a shape of a parallelepiped.

Any material can be used for ceramic body 1 (ceramic layer 1a), and for example, dielectric ceramics mainly including $BaTiO_3$ may preferably be used. Instead of $BaTiO_3$, dielectric ceramics mainly including another material such as, for example, $CaTiO_3$, $SrTiO_3$, or $CaZrO_3$ may be used. Ceramic layer 1a may have any thickness, and preferably has a thickness, for example, from about 0.3 µm to about 3.0 µm.

Internal electrodes 2 and 3 may mainly be made of any type of metal, and for example, Ni may preferably be used. Instead of Ni, another metal such as, for example, Cu, Ag, Pd, or Au may be used. Ni, Cu, Ag, Pd, or Au may be in a form of an alloy with another metal. Internal electrodes 2 and 3 may have any thickness, and preferably have a thickness, for example, from about 0.1 μm to about 2.0 μm. Ceramics identical in composition to ceramic body (ceramic layer 1a) are also preferably added to internal electrodes 2 and 3.

A plurality of internal electrodes 2 are extended to one end surface of ceramic body 1. A plurality of internal electrodes 3 are extended to the other end surface of ceramic body 1.

External electrode 4 is provided on one end surface of ceramic body 1. External electrode 5 is provided on the other end surface of ceramic body 1. External electrodes 4 and 5 may extend from the respective end surfaces to a pair of main surfaces and a pair of side surfaces.

The plurality of internal electrodes 2 are connected to external electrode 4. The plurality of internal electrodes 3 are connected to external electrode 5.

External electrodes 4 and 5 each include an underlying electrode layer 6 provided on an outer surface of ceramic body 1, a first Ni plated layer 7 provided on an outer side of underlying electrode layer 6, a second Ni plated layer 9 provided on an outer side of first Ni plated layer 7, an Ni—Sn alloy layer 10 provided on an outer side of second Ni plated layer 9, and an Sn plated layer 11 provided on an outer side of Ni—Sn alloy layer 10.

Underlying electrode layer 6 defines and functions as a base for external electrodes 4 and 5.

Underlying electrode layer 6 may mainly be made of any type of metal, and for example, Cu may preferably be used. Instead of Cu, another metal such as, for example, Ni, Ag, Pd, or Au may be adopted. Cu, Ni, Ag, Pd, or Au may be in a form of an alloy with another metal.

Underlying electrode layer 6 may have any thickness, and in a portion having a small thickness thereof, it preferably has a thickness, for example, from about 5 μm to about 30 μm.

Underlying electrode layer 6 preferably contains glass, because the strength of a joint between ceramic body 1 and external electrodes 4 and 5 can be improved.

In the present preferred embodiment, underlying electrode layer 6 is formed, for example, by applying and baking a conductive paste as will be described later. Any method of forming underlying electrode layer 6 and any material and structure thereof, however, are applicable. Underlying electrode layer 6 may be formed simultaneously with firing of ceramic body 1 or may be formed by another method such as electroless plating, electrolytic plating, or sputtering. A plurality of formation methods may be combined. For example, a first layer may be formed by applying and baking a conductive paste and a second layer may be formed by electrolytic plating.

First Ni plated layer 7 is provided on the outer surface of underlying electrode layer 6. First Ni plated layer 7 is provided mainly to improve soldering heat resistance and joint performance. A stress relaxing agent is added to first Ni plated layer 7.

First Ni plated layer 7 may have any thickness, and preferably has a thickness, for example, from about 1.0 μm to about 5.0 μm. When the thickness is smaller than about 1.0 μm, soldering heat resistance and joint performance cannot be sufficiently improved. When the thickness is larger than about 5.0 μm, the thickness of first Ni plated layer 7 is larger than necessary.

Ni oxide 8 is provided on the outer surface of first Ni plated layer 7. Ni oxide 8 is normally Ni hydroxide.

In the present preferred embodiment, Ni oxide 8 is provided as a film on the entire or substantially the entire outer surface of first Ni plated layer 7. Ni oxide 8, however, is formed in various manners, and it is not limited to Ni oxide provided as a film on the entire or substantially the entire outer surface of first Ni plated layer 7. Ni oxide 8 may be provided as a film partially on the outer surface of first Ni plated layer 7 or distributed as spots on the outer surface of first Ni plated layer 7. Ni oxide 8 may have any thickness, and preferably has a thickness, for example, from about 2 nm to about 10 nm when it is provided as a film on the entire or substantially the entire outer surface of first Ni plated layer 7.

Second Ni plated layer 9 is provided on the outer side of first Ni plated layer 7 with Ni oxide 8 being interposed between the second Ni plated layer 9 and the first Ni plated layer 8. Second Ni plated layer 9 covers Ni oxide 8. An amount of oxide provided on the outer surface of second Ni plated layer 9 is small (an oxide coating is less likely to be provided). Therefore, by providing second Ni plated layer 9, Ni—Sn alloy layer 10 is readily provided. Second Ni plated layer 9 not only covers Ni oxide 8. Second Ni plated layer 9 may result in electroreduction which leads to reduction or disappearance of Ni oxide 8. A stress relaxing agent is also added to second Ni plated layer 9.

Second Ni plated layer 9 may have any thickness, and preferably has a thickness, for example, from about 0.2 μm to about 1.0 μm. When the thickness is smaller than about 0.2 μm, second Ni plated layer 9 cannot sufficiently cover Ni oxide 8 and cannot be alloyed with Sn plated layer 11 to form Ni—Sn alloy layer 10. When the thickness is larger than about 1.0 μm, a long time is required to form second Ni plated layer 9. Though second Ni plated layer 9 is alloyed with Sn plated layer 11 to form Ni—Sn alloy layer 10, the thickness of second Ni plated layer 9 above refers to a dimension after Ni—Sn alloy layer 10 is formed.

Ni—Sn alloy layer 10 is provided on the outer side of second Ni plated layer 9. Ni—Sn alloy layer 10 is formed by alloying by heat during heat treatment after Sn plated layer 11 is formed. By forming Ni—Sn alloy layer 10, solderability in solder mounting is improved. Namely, absence of Ni—Sn alloy layer 10 having a uniform thickness means that a large amount of oxide is produced on the outer surface of the plated layer (an oxide coating is thick). Then, in solder mounting, solder or a solder-Sn alloy does not sufficiently spread in a liquid state and a satisfactory solder fillet is not formed, and thus, joining by solder may be defective.

Ni—Sn alloy layer 10 may have any thickness, and preferably has a thickness, for example, from about 0.1 μm to about 0.3 μm. When the thickness is smaller than about 0.1 μm, solderability cannot be sufficiently improved. When the thickness is larger than about 0.3 μm, the thickness of Ni—Sn alloy layer 10 is larger than necessary.

Sn plated layer 11 is provided on the outer side of Ni—Sn alloy layer 10. Sn plated layer 11 is provided mainly to form Ni—Sn alloy layer 10 by being alloyed with second Ni plated layer 9 and to supply Sn in solder mounting. In solder mounting, Sn supplied from Sn plated layer 11 is mixed or alloyed with solder to form a solder-Sn alloy so that external electrodes 4 and 5 are joined to an electrode on a substrate or the like.

Sn plated layer 11 may have any thickness, and preferably has a thickness, for example, from about 1.0 μm to about 5.0 μm. When the thickness is smaller than about 1.0 μm, a sufficient amount of Sn cannot be supplied in forming Ni—Sn alloy layer 10 or joint by solder. When the thickness is larger than about 5.0 μm, the thickness of Sn plated layer 11 is larger than necessary.

Multilayer ceramic capacitor 100 (a ceramic electronic component) according to the present preferred embodiment structured as described above can be manufactured, for example, with an example of a manufacturing method shown in FIGS. 3A to 4F.

Figure 3A:
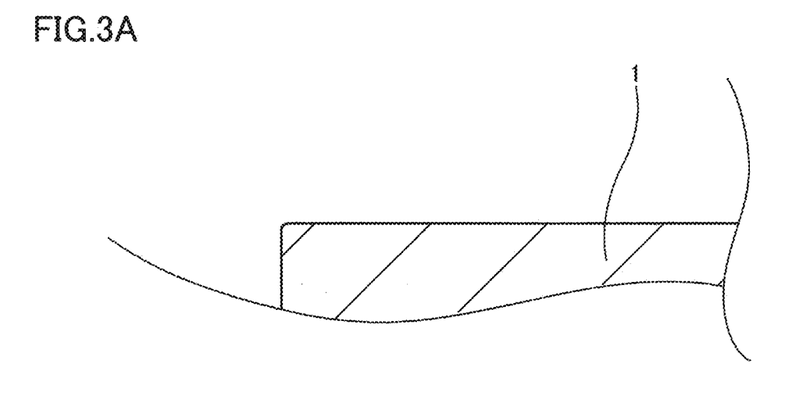
FIGS. 3A to 3C are illustrative diagrams showing steps performed in an exemplary method of manufacturing multilayer ceramic capacitor 100.

Initially, ceramic body 1 shown in FIG. 3A is made. As shown in FIGS. 1 and 2, ceramic body 1 includes internal electrodes 2 and 3 therein.

Though not shown, initially, ceramic slurry is made by preparing powders of dielectric ceramics, a binder resin, and a solvent and mixing them in a liquid state.

Then, a ceramic green sheet is made by applying the ceramic slurry as a sheet on a carrier film by using a die coater, a gravure coater, or a microgravure coater, for example, and drying the ceramic slurry. Instead of the coater, a doctor blade may be used to make a ceramic green sheet.

Then, a conductive paste prepared in advance is applied (for example, printed) to a main surface of a prescribed ceramic green sheet in a desired pattern to form internal electrodes 2 and 3. No conductive paste is applied to a ceramic green sheet to be an outer layer. For example, a conductive paste obtained by mixing a solvent, a binder resin, and metal powders (for example, Ni powders) can be used for the conductive paste.

Then, an unfired ceramic body is made by layering ceramic green sheets in a prescribed order and heating and compression-bonding the ceramic green sheets to integrate the ceramic green sheets. When the unfired ceramic body is a mother unfired ceramic body including a plurality of unfired ceramic bodies, the mother unfired ceramic body is preferably divided into individual unfired ceramic bodies at this stage.

Then, ceramic body 1 is completed by firing the unfired ceramic body in accordance with a prescribed profile. Before firing, binder removal treatment may preferably be performed to eliminate or reduce the binder resin contained in the unfired ceramic body. By firing the unfired ceramic body, the ceramic green sheet is fired to become ceramic layer 1a, and the conductive paste applied to the main surface of the ceramic green sheet is simultaneously fired to become internal electrodes 2 and 3.

Figure 3B:
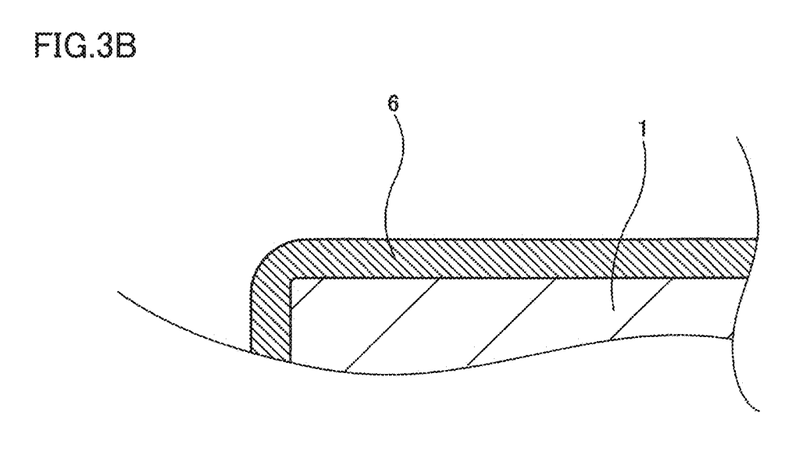

Then, as shown in FIG. 3B, underlying electrode layer 6 is formed on the outer surface of ceramic body 1. Specifically, initially, a conductive paste is applied. A solvent, a binder resin, metal powders (for example, Cu powders), and glass frits are mixed in the applied conductive paste. Then, underlying electrode layer 6 is formed by heating the conductive paste to a prescribed temperature to bake the conductive paste onto the outer surface of ceramic body 1.

Figure 3C:
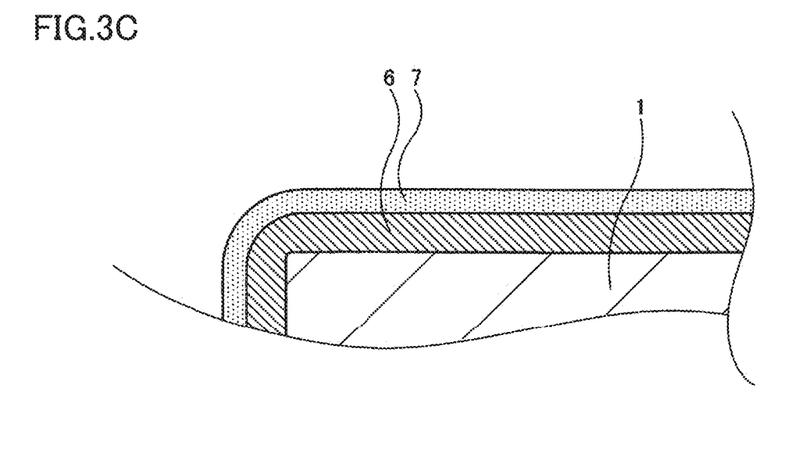

Then, as shown in FIG. 3C, first Ni plated layer 7 is formed by electrolytic plating on the outer surface of underlying electrode layer 6. A stress relaxing agent is added to an Ni plating bath for forming first Ni plated layer 7.

In the present preferred embodiment, a temperature of the Ni plating bath for forming first Ni plated layer 7 is preferably set to approximately 60° C., for example. The reason why the temperature of the Ni plating bath is set to a temperature as high as approximately 60° C. is to improve efficiency in forming plating to form first Ni plated layer 7 in a short period of time. Any type of stress relaxing agent may be used, and a substance generally used as the stress relaxing agent may be used.

Figure 4D:
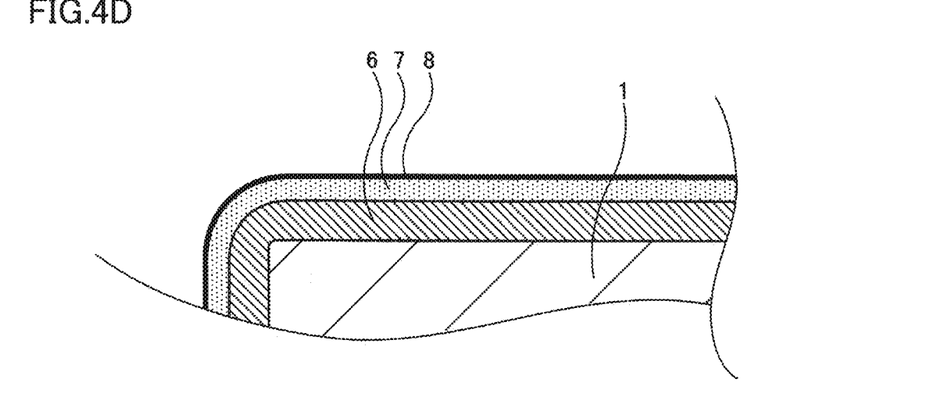
FIGS. 4D to 4F are a continuation to FIG. 3C and are illustrative diagrams showing steps performed in the exemplary method of manufacturing multilayer ceramic capacitor 100.

When ceramic body 1 on which first Ni plated layer 7 is formed is removed from the Ni plating bath, Ni oxide 8 (normally, Ni hydroxide) is formed on the outer surface of first Ni plated layer 7 in an extremely short period of time as shown in FIG. 4D. Since four factors (a) to (d) ((a) a small grain size and a large number of grain boundaries in an Ni plated coating to which the stress relaxing agent is added; (b) attachment of Ni plating liquid to the outer surface of first Ni plated layer 7 drawn up from the Ni plating bath; (c) a high temperature of first Ni plated layer 7 and the Ni plating liquid attached to first Ni plated layer 7 due to the high temperature (approximately 60° C., for example) of the Ni plating bath; and (d) exposure of first Ni plated layer 7 drawn up from the Ni plating bath to oxygen in air) that accelerate formation of Ni oxide are combined, Ni oxide 8 is formed on the outer surface of first Ni plated layer 7 in an extremely short period of time.

Figure 4E:
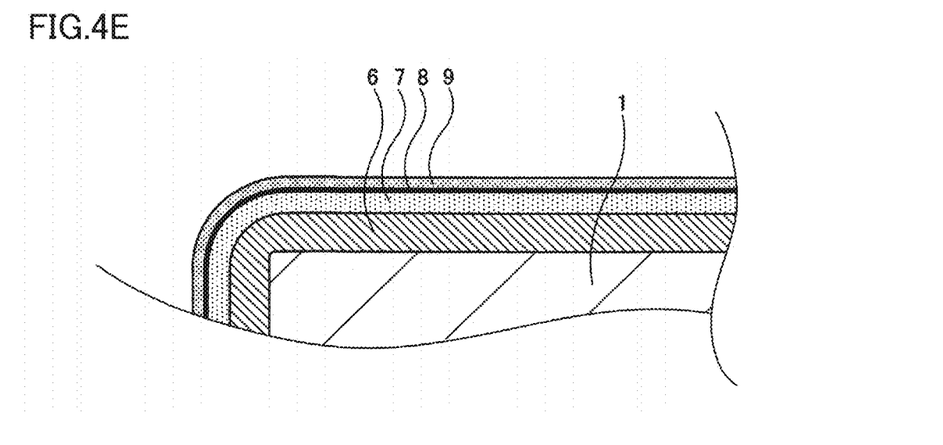

Then, as shown in FIG. 4E, second Ni plated layer 9 is formed by electrolytic plating on the outer side of first Ni plated layer 7 with Ni oxide 8 being interposed between the second Ni plated layer 9 and the first Ni plated layer 7. In the present preferred embodiment, an Ni plating bath the same or substantially the same in composition to the Ni plating bath for forming first Ni plated layer 7 is preferably used as the Ni plating bath for forming second Ni plated layer 9. An Ni plating bath different in composition, however, may be used. A stress relaxing agent is also added to the Ni plating bath for forming second Ni plated layer 9.

In the present preferred embodiment, a temperature of the Ni plating bath for forming second Ni plated layer 9 is preferably set to approximately 30° C., for example. The reason why the temperature of the Ni plating bath is set to a temperature as low as approximately 30° C. is to reduce or prevent formation of Ni oxide (normally, Ni hydroxide) on the outer surface of second Ni plated layer 9 at the time when ceramic body 1 on which second Ni plated layer 9 is formed is removed from the Ni plating bath, or in other words, to exclude the factor (c) ((c) a high temperature of the Ni plated layer and the Ni plating liquid attached to the Ni plated layer due to the high temperature of the Ni plating bath) among the four factors (a) to (d) that accelerate formation of Ni oxide. When the temperature of the Ni plating bath is set to a temperature as low as approximately 30° C., however, plating in a high-current-density region cannot be performed as compared with an example where the temperature of the Ni plating bath is set to a temperature as high as approximately 60° C. Therefore, time required to form an Ni plated layer of the same thickness is longer.

According to the example of a manufacturing method in the present preferred embodiment, the temperature of the Ni plating bath is preferably set to a temperature as low as approximately 30° C., for example. Therefore, even though ceramic body 1 is removed from the Ni plating bath, Ni oxide in an amount large enough to interfere with formation of Ni—Sn alloy layer 10 is not formed on the outer surface of second Ni plated layer 9 in a short period of time. Ni oxide, however, may be formed on the outer surface of second Ni plated layer 9 over time. Therefore, after ceramic body 1 on which second Ni plated layer 9 is formed is removed from the Ni plating bath, the next step of forming Sn plated layer 11 is preferably started without delay.

Second Ni plated layer 9 covers Ni oxide 8 formed on the outer surface of first Ni plated layer 7. In forming second Ni plated layer 9, electroreduction by new Ni may bring about removal and resultant reduction of Ni oxide 8. Alternatively, in forming second Ni plated layer 9, electroreduction by new Ni may also bring about removal and resultant disappearance of Ni oxide 8.

Figure 4F:
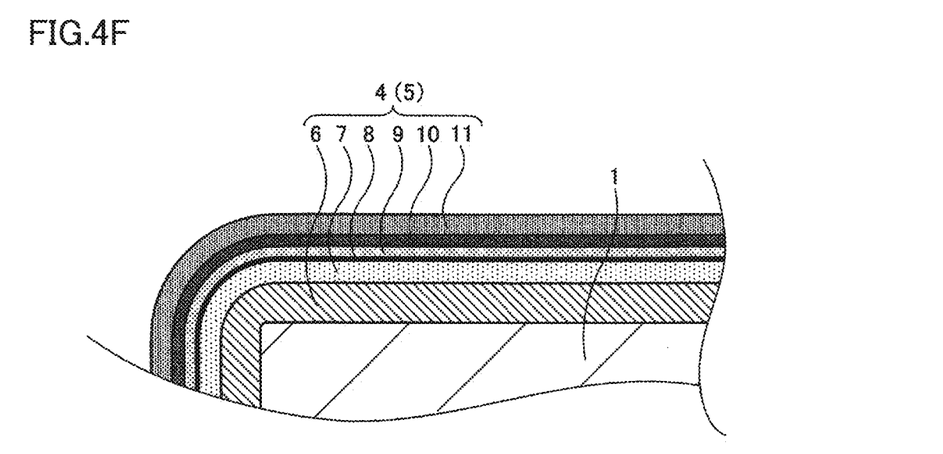

Then, as shown in FIG. 4F, Sn plated layer 11 is formed by electrolytic plating on the outer side of second Ni plated layer 9. In the present preferred embodiment, a temperature of an Sn plating bath for forming Sn plated layer 11 is preferably set to approximately 60° C., for example. Consequently, Sn plated layer 11 is formed on the outer side of second Ni plated layer 9 and Ni—Sn alloy layer 10 is formed between second Ni plated layer 9 and Sn plated layer 11.

Ni—Sn alloy layer 10 is formed between second Ni plated layer 9 and Sn plated layer 11 by alloying by mutual diffusion between Ni and Sn over time by heat after Sn plated layer 11 is formed. In the present preferred embodiment, second Ni plated layer 9 covers Ni oxide 8 formed on the outer side of first Ni plated layer 7 and suppresses formation of Ni oxide on the outer surface of second Ni plated layer 9. Therefore, Ni—Sn alloy layer 10 uniform in thickness and satisfactory in quality is formed on the outer surface of second Ni plated layer 9. Sn not used to form of Ni—Sn alloy layer 10 remains as Sn plated layer 11 on the outer surface of Ni—Sn alloy layer 10.

As set forth above, multilayer ceramic capacitor 100 according to the present preferred embodiment is completed. Heat treatment may further be performed after Sn plated layer 11 is formed. In this case, Ni—Sn alloy layer 10 may further be grown by heat during heat treatment.

In multilayer ceramic capacitor 100 according to the present preferred embodiment, an amount of oxide produced on the outer surface of second Ni plated layer 9 of external electrodes 4 and 5 is small (an oxide coating is thin) and the Ni—Sn alloy layer uniform in thickness and satisfactory in quality is formed between second Ni plated layer 9 and Sn plated layer 11. Therefore, the multilayer ceramic capacitor has excellent solderability. Therefore, in multilayer ceramic capacitor 100, in solder mounting, a satisfactory solder fillet is provided on external electrodes 4 and 5 and external electrodes 4 and 5 are satisfactorily joined to an electrode on a substrate or the like.

In multilayer ceramic capacitor 100 according to the present preferred embodiment, a stress relaxing agent is added to first Ni plated layer 7 and second Ni plated layer 9 of external electrodes 4 and 5. Therefore, in solder mounting (reflow solder mounting) or in warpage of the substrate on which the multilayer ceramic capacitor is mounted, cracking in ceramic body 1 is less likely to occur.

Exemplary multilayer ceramic capacitor 100 (ceramic electronic component) and an exemplary method of manufacturing multilayer ceramic capacitor 100 according to the present preferred embodiment are described above. The present invention, however, is not limited to the contents described above and the present invention can variously be modified in line with the gist of the present invention.

For example, although multilayer ceramic capacitor 100 is described by way of example as the ceramic electronic component in the present preferred embodiment, any type of ceramic electronic component is applicable to preferred embodiments of the present invention and the ceramic electronic component is not limited to the multilayer ceramic capacitor. The ceramic electronic component according to a preferred embodiment of the present invention may be a ceramic electronic component of another type such as a ceramic inductor, a ceramic LC composite component, or a ceramic thermistor, for example. The ceramic electronic component according to a preferred embodiment of the present invention should only include a ceramic body, and the ceramic body does not have to include a multilayer structure. When the ceramic electronic component is a ceramic capacitor, the ceramic capacitor is not limited to a ceramic capacitor including two external electrodes and may be a ceramic capacitor including three or more external electrodes, for example.

A structure or a material for external electrodes 4 and 5 shown in the present preferred embodiment is by way of example, and for example, an electrode layer may further be included. Although underlying electrode layer 6 is formed by applying and baking a conductive paste in the present preferred embodiment, underlying electrode layer 6 may be formed by another method.

Ni oxide 8 is provided as a film on the entire or substantially the entire outer surface of first Ni plated layer 7 in the present preferred embodiment. Alternatively, Ni oxide may be partially be provided as a film or be distributed as spots on the outer surface of first Ni plated layer 7. Ni oxide 8 may be reduced or removed in forming second Ni plated layer 9.

In the present preferred embodiment, a temperature of the Ni plating bath for forming first Ni plated layer 7 is preferably set to approximately 60° C. and a temperature of the Ni plating bath for forming second Ni plated layer 9 is preferably set to approximately 30° C., for example. These temperatures, however, can be changed as appropriate so long as a condition that the temperature of the Ni plating bath for forming second Ni plated layer 9 is lower than the temperature of the Ni plating bath for forming first Ni plated layer 7 is satisfied.

The ceramic electronic component according to a preferred embodiment of the present invention is as described in the section "SUMMARY OF THE INVENTION."

The ceramic electronic component preferably further includes the Ni—Sn alloy layer provided on the outer side of the second Ni plated layer and the Sn plated layer provided on the outer side of the Ni—Sn alloy layer. In this case, the external electrode exhibits excellent solderability due to the Ni—Sn alloy layer.

Coverage (a ratio of covering) by the Ni—Sn alloy layer is preferably about 100%. In this case, since an amount of oxide produced on the outer surface of the plated layer is small (an oxide coating is thin), the external electrode exhibits better solderability.

A non-limiting example of a method of manufacturing a ceramic electronic component according to a preferred embodiment of the present invention is as described in the section "SUMMARY OF THE INVENTION."

In the method of manufacturing a ceramic electronic component, the temperature of the Ni plating bath for forming the first Ni plated layer is preferably equal to or higher than 40° C., for example. In this case, the first Ni plated layer can be formed in a short period of time at high efficiency in forming plating.

The temperature of the Ni plating bath for forming the second Ni plated layer is preferably equal to or lower than 35° C. and further preferably equal to or lower than 30° C., for example. In this case, formation of Ni oxide on the outer surface of the second Ni plated layer can be reduced or prevented.

The Ni plating bath for forming the first Ni plated layer is preferably the same or substantially the same in composition to the Ni plating bath for forming the second Ni plated layer. In this case, the first Ni plated layer and the second Ni plated layer can be homogenously formed. In addition, control of the Ni plating bath is facilitated.

In the step of forming the second Ni plated layer, Ni oxide formed on the outer surface of the first Ni plated layer is preferably reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body including an internal electrode therein; and
at least two external electrodes provided on an outer surface of the ceramic body;
wherein
each of the external electrodes includes:
an underlying electrode layer provided on the outer surface of the ceramic body;
a first Ni plated layer provided on an outer side of the underlying electrode layer; and
a second Ni plated layer provided on an outer side of the first Ni plated layer;
Ni oxide is present between the first Ni plated layer and the second Ni plated layer; and
the Ni oxide has a thickness from about 2 nm to about 10 nm.

2. The ceramic electronic component according to claim 1, further comprising:
an Ni—Sn alloy layer provided on an outer side of the second Ni plated layer; and
an Sn plated layer provided on an outer side of the Ni—Sn alloy layer.

3. The ceramic electronic component according to claim 2, wherein coverage by the Ni—Sn alloy layer is about 100%.

4. The ceramic electronic component according to claim 1, wherein the Ni oxide is Ni hydroxide.

5. The ceramic electronic component according to claim 1, wherein the underlying electrode layer mainly includes Cu.

6. The ceramic electronic component according to claim 1, wherein
the ceramic body includes a plurality of ceramic layers and a plurality of internal electrodes that are layered; and
the ceramic electronic component is a multilayer ceramic electronic component.

7. The ceramic electronic component according to claim 6, wherein the multilayer ceramic electronic component is a multilayer ceramic capacitor.

8. A method of manufacturing a ceramic electronic component comprising:
forming a ceramic body including an internal electrode therein; and
forming an external electrode on an outer surface of the ceramic body; wherein
the forming the external electrode includes:
forming an underlying electrode layer on the outer surface of the ceramic body;
forming a first Ni plated layer by electrolytic plating on an outer side of the underlying electrode layer;
forming a second Ni plated layer by electrolytic plating on an outer side of the first Ni plated layer; and
forming an Sn plated layer by electrolytic plating on an outer side of the second Ni plated layer;
a stress relaxing agent is added to an Ni plating bath for forming the first Ni plated layer and an Ni plating bath for forming the second Ni plated layer;
a temperature of the Ni plating bath for forming the second Ni plated layer is lower than a temperature of the Ni plating bath for forming the first Ni plated layer.

9. The method of manufacturing a ceramic electronic component according to claim 8, wherein the temperature of the Ni plating bath for forming the first Ni plated layer is equal to or higher than about 40° C.

10. The method of manufacturing a ceramic electronic component according to claim 8, wherein the temperature of the Ni plating bath for forming the second Ni plated layer is equal to or lower than about 35° C.

11. The method of manufacturing a ceramic electronic component according to claim 8, wherein the Ni plating bath for forming the first Ni plated layer has the same or substantially the same composition as the Ni plating bath for forming the second Ni plated layer.

12. The method of manufacturing a ceramic electronic component according to claim 8, wherein Ni oxide is formed on an outer surface of the first Ni plated layer after the forming a first Ni plated layer.

13. The method of manufacturing a ceramic electronic component according to claim 12, wherein in the forming the second Ni plated layer, the Ni oxide formed on the outer surface of the first Ni plated layer is reduced.

14. The method of manufacturing a ceramic electronic component according to claim 8, wherein in the forming an Sn plated layer, an Ni—Sn alloy layer is formed between the second Ni plated layer and the Sn plated layer.

15. The method of manufacturing a ceramic electronic component according to claim 8, further comprising:
heat treating after the forming an Sn plated layer; wherein
in the forming an Sn plated layer, an Ni—Sn alloy layer is formed between the second Ni plated layer and the Sn plated layer; and
in the heat treating, the Ni—Sn alloy layer is grown or a new Ni—Sn alloy layer is formed between the second Ni plated layer and the Sn plated layer.

16. The method of manufacturing a ceramic electronic component according to claim 14, wherein coverage by the Ni—Sn alloy layer is about 100%.

17. The method of manufacturing a ceramic electronic component according to claim 12, wherein the Ni oxide is Ni hydroxide.

18. The method of manufacturing a ceramic electronic component according to claim 8, wherein the underlying electrode layer mainly includes Cu.

19. The method of manufacturing a ceramic electronic component according to claim 8, wherein the forming the ceramic body includes forming the ceramic body including a plurality of ceramic layers and a plurality of internal electrodes that are layered, such that the ceramic electronic component is a multilayer ceramic electronic component.

20. The method of manufacturing a ceramic electronic component according to claim 19, wherein the multilayer ceramic electronic component is a multilayer ceramic capacitor.

* * * * *